US010838093B2

(12) United States Patent
Akcelik et al.

(10) Patent No.: US 10,838,093 B2
(45) Date of Patent: Nov. 17, 2020

(54) KRYLOV-SPACE-BASED QUASI-NEWTON PRECONDITIONER FOR FULL-WAVEFIELD INVERSION

(71) Applicants: Volkan Akcelik, Spring, TX (US); Huseyin Denli, Basking Ridge, NJ (US)

(72) Inventors: Volkan Akcelik, Spring, TX (US); Huseyin Denli, Basking Ridge, NJ (US)

(73) Assignee: ExxonMobil Upstream Research Company, Spring, TX (US)

(*) Notice: Subject to any disclaimer, the term of this patent is extended or adjusted under 35 U.S.C. 154(b) by 637 days.

(21) Appl. No.: 15/190,222

(22) Filed: Jun. 23, 2016

(65) Prior Publication Data
US 2017/0003409 A1    Jan. 5, 2017

Related U.S. Application Data

(60) Provisional application No. 62/188,063, filed on Jul. 2, 2015.

(51) Int. Cl.
G01V 1/30    (2006.01)
G01V 1/28    (2006.01)

(52) U.S. Cl.
CPC .................. *G01V 1/30* (2013.01); *G01V 1/28* (2013.01); *G01V 1/306* (2013.01)

(58) Field of Classification Search
CPC . G01V 1/30; G01V 1/306; G01V 1/28; G01V 1/282
See application file for complete search history.

(56) References Cited

U.S. PATENT DOCUMENTS

| 3,812,457 A | 5/1974 | Weller |
| 3,864,667 A | 2/1975 | Bahjat |
| 4,159,463 A | 6/1979 | Silverman |
| 4,168,485 A | 9/1979 | Payton et al. |
| 4,545,039 A | 10/1985 | Savit |
| 4,562,650 A | 1/1986 | Nagasawa et al. |

(Continued)

FOREIGN PATENT DOCUMENTS

| CA | 2 796 631 | 11/2011 |
| EP | 1 094 338 | 4/2001 |

(Continued)

OTHER PUBLICATIONS

Nocedal, J. "Updating Quasi-Newton Matrices with Limited Storage" Mathematics of Computation, vol. 35, No. 151, pp. 773-782 (1980) (Year: 1980).*

(Continued)

*Primary Examiner* — Jay Hann
(74) *Attorney, Agent, or Firm* — ExxonMobil Upstream Research Company—Law Department

(57) ABSTRACT

A method, including: storing, in a computer memory, seismic data acquired from a seismic survey of a subsurface region; and generating, with a computer, a final subsurface physical property model of the subsurface region by processing the seismic data with an iterative full wavefield inversion method, wherein the iterative full wavefield inversion method generates the final subsurface physical property model by iteratively applying a linear solver with a preconditioner that is generated from information from one or more previous iterations of the linear solver.

10 Claims, 2 Drawing Sheets

(56) References Cited

U.S. PATENT DOCUMENTS

| | | |
|---|---|---|
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | Verwest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vaage |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,190,405 B2 * | 5/2012 | Appleyard ............... E21B 43/00 703/2 |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 9,601,109 B2 * | 3/2017 | Horesh ............... G06N 3/084 |
| 2002/0049540 A1 | 4/2002 | Beve et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |

(56) References Cited

U.S. PATENT DOCUMENTS

| | | |
|---|---|---|
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1 | 3/2011 | Xia et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Ai-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316791 A1* | 12/2012 | Shah ............... G01V 1/282 702/14 |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |
| 2015/0073755 A1 | 3/2015 | Tang et al. |
| 2016/0238729 A1* | 8/2016 | Warner ............... G01V 1/282 |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Nocedal, J. "Numerical Optimization" 2nd Ed. (2006) (Year: 2006).*

U.S. Appl. No. 14/329,431, filed Jul. 11, 2014, Krohn et al.

U.S. Appl. No. 14/330,767, filed Jul. 14, 2014, Tang et al.

Akcelik, V., et al. (2006) "Parallel algorithms for PDE constrained optimization, in Parallel Processing for Scientific Computing", *SIAM*, 2006; Ch 16, pp. 291-322.

Knoll, D.A. and Keyes, D.E., (2004) "Jacobian-free Newton-Krylov Methods: A Survey of Approaches and Applications", *Journal of Computational Physics* 193, 357-397.

Krebs, J.R., et al. (2009) "Fast Full-wavefield Seismic Inversion Using Encoded Sources", *Geophysics*, 74, No. 6, pp. WCC177-WCC188.

Metivier, L. et al. (2013) "Full Waveform Inversion and Truncated Newton Method", *SIAM J. Sci. Comput.*, 35(2), B401-6437.

Morales, J.L. and Nocedal, J. (2000) "Automatic Preconditioning by Limited Memory Quasi-Newton Updating", *SIAM J. Optim*, 10(4), 1079-1096.

Nocedal, J. and Wright, J. (2006) *"Numerical Optimization"*, 2nd Edition, Springer; pp. I-Xii, 101-192.

Akcelik, V., et al. (2002) "Parallel Multiscale Gauss-Newton-Krylov Methods for Inverse Wave Propogation", Supercomputing, *ACM/IEEE 2002 Conference* Nov. 16-22, 2002.

Metivier, L. et al. (2014) "Full Waveform Inversion and Truncated Newton Method: quantitative imaging of complex subsurface structures", *Geophysical Prospecting*, vol. 62, pp. 1353-1375.

Virieux, J. et al. (2009) "An overview of full-waveform inversion in exploration geophysics", *Geophysics*, vol. 74, No. 6.pp. WCC127-WCC152.

\* cited by examiner

KRYLOV-SPACE-BASED QUASI-NEWTON PRECONDITIONER FOR FULL-WAVEFIELD INVERSION

CROSS-REFERENCE TO RELATED APPLICATION

This application claims the benefit of U.S. Provisional Patent Application 62/188,063 filed Jul. 2, 2015 entitled KRYLOV-SPACE-BASED QUASI-NEWTON PRECONDITIONER FOR FULL WAVEFIELD INVERSION, the entirety of which is incorporated by reference herein.

FIELD OF THE INVENTION

Exemplary embodiments described herein pertain generally to the field of geophysical prospecting, and more particularly to geophysical data processing. An exemplary embodiment can increase the speed of convergence of full wavefield inversion (FWI).

BACKGROUND

This section is intended to introduce various aspects of the art, which may be associated with exemplary embodiments of the present technological advancement. This discussion is believed to assist in providing a framework to facilitate a better understanding of particular aspects of the present technological advancement. Accordingly, it should be understood that this section should be read in this light, and not necessarily as admissions of prior art.

Seismic inversion is a process of extracting subsurface information from the data measured at the surface of the earth acquired during a seismic survey. In a typical seismic survey, seismic waves are generated by a source positioned at desired locations. As the source generated wave propagates through the subsurface and travels back to the receiver locations where it is recorded.

Full waveform inversion (FWI) is a seismic processing method which can potentially exploit the full seismic record including events that are treated as "noise" by standard seismic processing algorithms. FWI iteratively minimizes an objective function based on a comparison of a simulated and measured seismic records. Even with today's available high-performance computing resources, one of the biggest challenges to FWI is still the computational cost. Nevertheless, the benefit of inferring a detailed representation of the subsurface using this method is expected to outweigh this cost, and development of new algorithms and workflows that lead to faster turnaround time is a key step towards making this technology feasible for field-scale applications, allowing users to solve larger scale problems faster. The computationally most intensive component of FWI is the simulations of the forward and adjoint wavefields. The number of total forward and adjoint simulations is proportional to the number of iterations, which is typically on the order of hundreds to thousands. Any method reducing number of FWI iterations will reduce to number of forward and adjoint simulation calls and the computational run time.

The crux of any FWI algorithm can be described as follows: using a given starting subsurface physical property model, synthetic seismic data are generated, i.e. modeled or simulated, by solving the wave equation using a numerical scheme (e.g., finite-difference, finite-element, spectral element, and etc.) which typically divides the model domain into a set of nonoverlapping cells (also referred as elements or blocks). The term velocity model or geophysical property model as used herein refers to an array of numbers, where each number, which may also be called a model parameter, is a value of velocity or another geophysical property in a cell. The synthetic seismic data are compared with the field seismic data and using a norm, an error or objective function is calculated. Using this objective function and an optimization algorithm, a modified subsurface model is generated which is used to simulate a new set of synthetic seismic data. This new set of synthetic seismic data is compared with the field data to generate a new objective function. This process is repeated until the optimization algorithm satisfactorily minimizes the objective function and the final subsurface model is generated. A global or local optimization method is used to minimize the objective function and to update the subsurface model. Further details regarding FWI can be found in U.S. Patent Publication 2011/0194379 to Lee et al., the entire contents of which are hereby incorporated by reference.

Common FWI methods iteratively minimize the objective function which is subject to the wavefield propagation—the physics of the problem. A (nonlinear) iteration i of FWI involves the following two steps: (1) compute a search direction for the current model $m_i$, $d(m_i)$; and (2) search for an update to the current model which is a perturbation along the search direction and that reduces the objective function. The FWI processing starts from a given starting model $m_0$ provided by the user. FWI algorithms iteratively improve this starting model using an optimization technique, $$m_{i+1} = m_i + \alpha_i d_i, \quad (1)$$

where $\alpha_i$ is a scalar parameter, $d_i$ is the search direction and i is the nonlinear iteration number. The search direction is chosen along a globalization strategy [1,2]. For the second-order optimization methods, the search direction is obtained by solving $$H_i d_i = -g_i, \quad (2)$$

where $H_i$ can be Newton's Hessian or Gauss-Newton's Hessian. For the large scale optimization problems, the Hessian is both prohibitively large to store and compute explicitly. Instead, an approximate inverse Hessian $H_i^{-1}$ is used to calculate the search direction. There are several choices for this approximation, such as (i) quasi-Newton methods and (ii) truncated Newton's or Gauss-Newton methods (note that "(Gauss)-Newton" is used herein to refer to both Newton and Gauss-Newton methods).

SUMMARY

In an exemplary embodiment, a method can include: storing, in a computer memory, seismic data acquired from a seismic survey of a subsurface region; and generating, with a computer, a final subsurface physical property model of the subsurface region by processing the seismic data with an iterative full wavefield inversion method, wherein the iterative full wavefield inversion method generates the final subsurface physical property model by iteratively applying a linear solver with a preconditioner that is generated from information from one or more previous iterations of the linear solver.

In an exemplary embodiment, the linear solver is a Krylov-space method.

In an exemplary embodiment, the linear solver is a conjugate gradient method.

In an exemplary embodiment, the method can further include generating the preconditioner with a limited-memory Broyden-Fletcher-Goldfarb-Shanno (BFGS) method.

In an exemplary embodiment, the method can further include generating the preconditioner with a quasi-Newton method.

In an exemplary embodiment, the method can further include: storing, in a computer memory, a change in an optimization parameter of the full wavefield inversion method and a change in a gradient of a cost function used in the full wavefield inversion method for each of a plurality of iterations of the linear solver; generating the preconditioner based on the change in the optimization parameter and the change in the gradient of the cost function from each of the plurality of iterations of the linear solver; and applying the preconditioner to a subsequent iteration of the linear solver, relative to the plurality of iterations.

In an exemplary embodiment, the preconditioner is a fixed preconditioner, and the preconditioner does not change when solving a linear system and it is only based on changes in the optimization parameter and changes in the gradient of the cost function from previous iterations of the linear solver.

In an exemplary embodiment, the preconditioner is a variable preconditioner, and the preconditioner can change when solving a linear system, and is based on changes in the optimization parameter and changes in the gradient of the cost function from previous iterations of the linear solver and a current linear iteration of the linear solver.

In an exemplary embodiment, the linear solver is non-flexible.

In an exemplary embodiment, the linear solver is flexible.

In an exemplary embodiment, the change in the optimization parameter for a standard quasi-Newton algorithm is replaced with a change in a search direction of a linear system.

In an exemplary embodiment, the change in the gradient for the standard quasi-Newton algorithm is replaced with a change in a residual of the linear solver.

In an exemplary embodiment, the optimization parameter is the search direction and the gradient is a residual of a linear system.

In an exemplary embodiment, the linear solver is a Krylov-space method.

In an exemplary embodiment, the method can further include managing hydrocarbons based on the final subsurface physical property model of the subsurface region.

In an exemplary embodiment, the method can further include: creating, with a processor, an image of the subsurface region from the final subsurface physical property model.

In an exemplary embodiment, the method can further include: using the final subsurface physical property model in interpreting a subsurface region for hydrocarbon exploration or production.

In an exemplary embodiment, the method can further include drilling for hydrocarbons at a location determined using the final subsurface physical property model of the subsurface region.

In an exemplary embodiment, the linear solver is a generalized minimal residual method.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DESCRIPTION OF THE INVENTION

Figure 1:
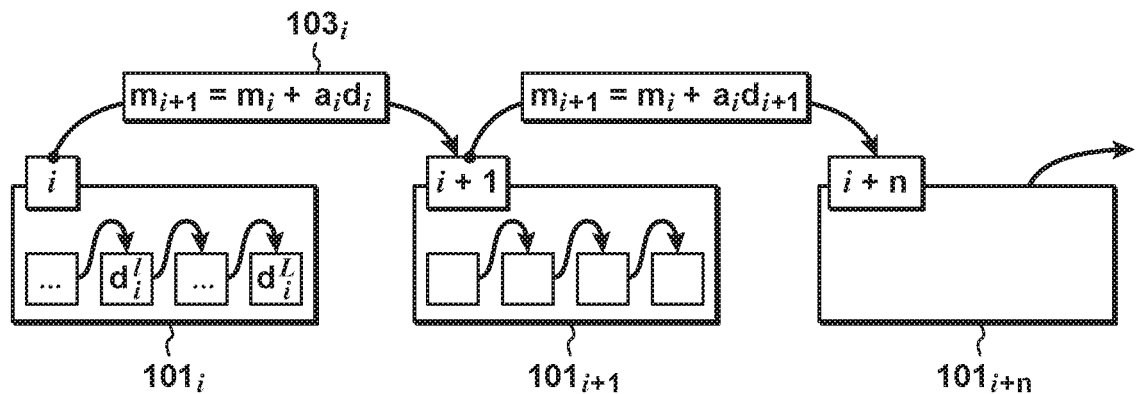
FIG. 1 illustrates the linear and nonlinear iterative methods that are included in the present technological advancement.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

The present technological advancement can increase the speed for convergence of FWI by several factors when second order methods are used as the optimization technique. The present technological advancement can uniquely combine two known optimization techniques: the quasi-Newton methods (such as L-BFGS) (first method) and the truncated Newton-or Gauss-Newton)-method (second method). In the present technological advancement, the second method can be used as an optimization algorithm and the first method can be used to speed up the convergence of the second method as a preconditioner.

Quasi-Newton Methods

Quasi-Newton methods replace $H_i^{-1}$ with its approximation in equation (2) when solving for d. These methods approximate the inverse Hessian operator (H) using gradient and model parameter changes throughout nonlinear iteration (this can be contrasted with (Gauss) Newton's method, which does not approximate the Hessian, but (approximately) solves Equation (2)).

Not all quasi-Newton methods are directly applicable to FWI problems due to its large-scale nature. However, quasi-Newton methods are modified and extended in several ways to make them suitable for large-scale optimization problems. The members of the quasi-Newton methods suitable for large scale optimization problems are so called limited-memory quasi-Newton methods. The limited-memory BFGS (Broyden-Fletcher-Goldfarb-Shanno) (L-BFGS) algorithm is the most common member suitable for FWI, as it is robust and computationally inexpensive and easy to implement [2]. All the preconditioner approaches introduced in the rest of the discussion will be based on the L-BFGS algorithm. However, the present technological advancement is not limited to the use of the L-BFGS algorithm; and other quasi-Newton algorithms such as limited memory SR1 method could also be used [2].

The inverse Hessian approximation $H_{i+1}^{-1}$ will be dense, so the cost of storing and manipulating it is computationally prohibitive for an FWI problem. To circumvent this problem, in limited memory BFGS approximation, $\{s_i, y_i\}$ pairs are used to approximate the action of $H_{i+1}^{-1}$ to a given vector. The vector pairs $\{s_i, y_i\}$ are defined as $$s_i = m_{i+1} - m_i, \text{ and} \quad (3)$$

$$y_i = g_{i+1} - g_i. \quad (4)$$

In other words, vector $s_i$ is the change in optimization parameter and vector $y_i$ is the change in the gradient $g_i$, at nonlinear iteration i.

The resulting recursive algorithm computes the application of the approximate inverse Hessian on a vector q by the L-BFGS approach using m pairs of $\{s_i, y_i\}$ is given in Algorithm (1) below. Note that given vector q and m vector pairs $\{s_i, y_i\}$, the algorithm returns the vector p, which is multiplication of the approximate inverse Hessian with vector q.

---

Algorithm 1: Two-loop L-BFGS algorithm [2]

---

FOR (k = m, m − 1, ... ,1) (m is the total number of pairs and k is the iterator for the loop)

$$\alpha_k = \frac{s_k^T q}{y_k^T s_k}$$

q = q − $\alpha_k y_k$
END FOR
p = $(H_i^0)^{-1}$q
FOR (k = 1,2, ... , m)

$$\beta = \frac{y_k^T p}{y_k^T s_k}$$

p = p + ($\alpha_k$ − $\beta$)$s_k$
END FOR
RETURN p

---

To complete the given L-BFGS algorithm (1), an initial estimate $(H_i^0)^{-1}$ needs to be provided to the algorithm. A method for choosing $(H_i^0)^{-1}$ that has proven to be effective in practice is to set $$(H_i^0)^{-1} = \frac{s_{i-1}^T y_{i-1}}{y_{i-1}^T y_{i-1}} I, \quad (5)$$

where the multiplier in front of identity matrix (I) is the scaling factor that attempts to estimate the size of the true Hessian matrix along the most recent search direction. The choice of scaling factor is important to ensure that the initial Hessian approximation is accurately scaled. Alternatively, the initial estimate $(H_i^0)^{-1}$ can be set to an available geophysics based preconditioner (such as U.S. Patent Publication No. 2015/0073755, the entirety of which is incorporated by reference). This mechanism enables different types of preconditioners to be combined with the present technological advancement.

Truncated (Gauss)-Newton Method

Another approach for solving the (Gauss)-Newton system (2) is to use an iterative method. In contrast to the Quasi-Newton method, this approach uses the Hessian operator (or its approximation as in Gauss-Newton method) directly. However, due to difficulty of storing and explicitly computing the Hessian operator, one can only employ an iterative method to solve (2) since these methods do not explicitly require the Hessian operator in (2) but rather they require application of the Hessian operator to a given vector. A preferred approach is to use one of the so-called Krylov space methods. A Krylov space method for solving a linear system Ax=b is an iterative method starting from some initial approximation $x_0$ and the corresponding residual $r_0 = b - Ax_0$, and iterating until the process possibly finds the exact solution or a stopping criteria is satisfied. These methods only require application of the Hessian operator to a given vector. For an FWI, application of Hessian on a vector can require computing at least one forward and one adjoint simulations of the wavefields. The linear iterations usually terminate using inner convergence criteria to improve speed of the nonlinear convergence of FWI[1, 2, 6]. The following discussion will utilize the conjugate gradient method as a non-limiting example of a Krylov space method.

After the search direction is computed by approximately solving (2) with an iterative linear Krylov-space solver (such as the conjugate gradient method), the FWI model is updated using a line search strategy. This procedure is repeated till convergence (see FIG. 1). The linear iterations for solving the system (2) with the conjugate gradient method are referred to as inner iterations 101, and the nonlinear iterations for updating the optimization parameter $m_i$ are referred to as outer iterations 103, and the relationship between the two are depicted in FIG. 1.

The accompanying Appendix provides additional information regarding implementation of the conjugate gradient method.

Preconditioning

When using the truncated (Gauss)-Newton method, the performance of linear solvers used to solve (2) can be improved by using a preconditioner. In this case, instead of solving equation (2), the following system is solved with the Krylov space methods $$B_i^{-1} H_i d_i = -B_i^{-1} g_i, \quad (6)$$

where $B_i^{-1}$ is the preconditioner to equation system (2) which is typically an approximation to the numerical inverse of the Hessian for optimization problems. One of the roles of the preconditioner is to reduce the condition number of the Hessian, so that equation system (6) can be solved more efficiently with less linear iterations. Note that, in (6) the preconditioner is applied from the left side of the operator $H_i$. There are other alternatives applications of the preconditioner, and the present technological advancement is not limited to the example provided here. (See Appendix, [2,6]).

Exemplary Embodiments

In following non-limiting exemplary embodiments of the present technological advancement, three methods are combined in a unique way: (i) Quasi-Newton method, (ii) truncated (Gauss)-Newton method and (iii) preconditioning. These exemplary embodiments use the truncated (Gauss)-Newton method as the optimization algorithm. In addition, the quasi-Newton approximation of the inverse Hessian is used as a preconditioner to the (Gauss)-Newton system. In other words, Algorithm 1 is used as a preconditioner when solving the system (2) using a Krylov-space method. To create the preconditioner of Algorithm 1, either information from the outer nonlinear iterations 103 or inner linear iterations 101 can be used to construct the preconditioner [1]. The main difference in these approaches (and one example of where the present technological advancement differentiates itself from the state-of-the-art [1]) is the way the vector pairs $\{s_i, y_i\}$ are created and used in the application of Algorithm 1 by the present technological advancement.

The state-of-the-art quasi-Newton preconditioning approach essentially approximates the inverse Hessian using the information captured from the outer iterations. The present technological advancement, on the contrary, introduces a quasi-Newton preconditioner which approximates the inverse Hessian using the history of inner iterations 101. The present technological advancement may include the use of any additional preconditioner to Algorithm 1 as a starting initial estimate of equation (5) for the iterative process. The present technological advancement significantly improves the convergence speed of FWI relative to the state-of-the-art preconditioning methods with an additional negligible computational cost.

First, it is observed that the solution of equation (2) via an iterative Krylov space method is equivalent to minimization of the following unconstrained quadratic optimization problem of the form $$\min_{d_i} f(d_i) = \frac{1}{2} d_i^T H_i d_i + d_i^T g_i \ldots \quad (7)$$

It is noted that solving (2) with a Krylov subspace method, such as the conjugate gradient method, is equivalent to minimizing an objective function in the form of (7). This idea is combined with the quasi-Newton method to create a preconditioner for the truncated Newton (or truncated Gauss-Newton) method.

In solving (2) with a Krylov-subspace method, the optimization parameter is the search direction $d_i$ and the gradient is equivalent to residual of the linear system (2). At a given inner linear iteration l, the gradient of the objective function (7) (also the residual of linear system (2)) is $$r^l = H_i d_i^l + g_i. \quad (8)$$

In a given linear iteration of the conjugate gradient method, the solution of (2) is updated with $$d_i^{l+1} = d_i^l + \mu^l \gamma^l. \quad (9)$$

And the residual (gradient) is updated with $$r^{l+1} = r^l + \mu^l H_i \gamma^l, \quad (10)$$

where $\mu^l$ is the step length and $\gamma^l$ is the search direction for the linear system (see [2, Appendix] for details).

The present technological advancement constructs the quasi-Newton preconditioner with the information captured from this inner optimization, $\{s_i, y_i\}$ pairs in equation (7). Using equation (3) and (4) along with (8) and (9) we get $$y^l = r^{l+1} - r^l = \mu^l H_i \gamma^l, \text{ and} \quad (11)$$

$$s^l = d_i^{l+1} - d_i^l = \mu^l \gamma^l. \quad (12)$$

In contrast, the quasi-Newton method uses outer nonlinear iterations to create $\{s_l, y_l\}$ pairs.

Noting that scaling factor $\mu^l$ in (11) and (12) can be omitted because it cancels out in the application of the preconditioner, leading to $$s^l = \gamma^l \text{ and } y^l = H_i \gamma^l. \quad (13)$$

To generate the preconditioner, the vectors in (13) are substituted into Algorithm 1, wherein the output is the multiplication of the approximate inverse Hessian with vector q, wherein this vector q can be the residual vector r in the preconditioned conjugate gradient method (see Appendix).

These choices of vectors (13) and their use, for example, are ways in which the present technological advancement distinguishes over the conventional techniques. In other words, on using inner iterations 101 of Krylov-space method (conjugate gradient method) as a linear solver, it is recognized that: "the change in the residual of inner iterations" plays the same role as "change in the gradient of outer iterations", and "the change in the solution of the linear system" plays the same role as "the change in the solution of the outer optimization system".

FIG. 1 is a depiction of the outer and inner iterations that are part of the truncated (Gauss)-Newton method, and how they relate to generating an updated physical properties subsurface model. The linear or inner iterations $101_i$ are repeated for equations (7)-(12) until a predetermined stopping criteria is reached, at which point $d_i$ is determined. As part of these iterations, L $\{s_i, y_i\}$ pairs are generated in linear iterations $101_i$, stored, and used to create the preconditioner for use in subsequent iterations. $d_i$, the output of the first linear iteration $101_i$ in FIG. 1, is used to update the model m at the outer iteration $103_i$, which is repeated for the subsequent outer iterations. The outer 103 and inner 101 iterations are repeated until the updated model converges or some other predetermined stopping criteria is satisfied.

Figure 2:
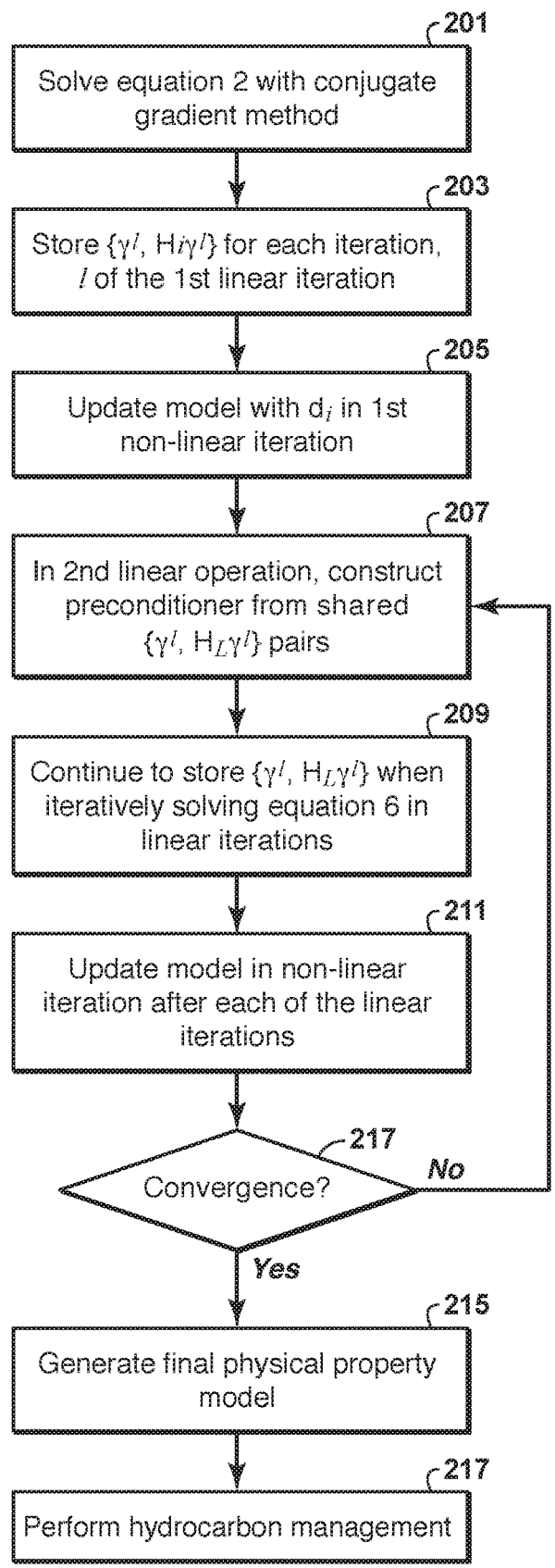
FIG. 2 illustrates an exemplary method embodying the present technological advancement.

FIG. 2 is a flow chart for an exemplary method of implementing the present technological advancement. The exemplary method of FIG. 2 builds on the truncated (Gauss)-Newton method of FIG. 1 by combining it with quasi-Newton methods and preconditioning.

In step 201, in the first non-linear iteration 103i, equation (2) is solved using the conjugate gradient method, without preconditioning, by performing several linear iterations $101_i$ of the conjugate gradient method. Since $(s_k, y_k)$ pairs are not available for the first iteration, the preconditioner of the present technological advancement is not used in the first nonlinear iteration. However, it is also possible to use another preconditioner when performing step 201.

In step 203, in the first nonlinear iteration $103_i$, when solving equation (2), vectors $\gamma^l$, and its product with the Hessian operator $H_i \gamma^l$ are stored in computer memory. Effectively, the right most terms in equations (9) and (10) can be stored for each iteration 1. As noted above, the scaling factor will cancel out and effectively it does not matter whether the scaling factor is stored along with vectors $\gamma^l$ and its product with the Hessian operator $H_i \gamma^l$.

In step 205, the model is updated in outer iteration $103_i$. The output of the inner iterations $101_i$ is $d_i$, which is used to update the model in the outer iteration $103_i$.

In step 207, in the second nonlinear iteration $103_{i+1}$, the stored pairs of $\{\gamma^l, H_i \gamma^l\}$ from the previous nonlinear iteration $103_i$ are used to construct quasi-Newton "inverse Hessian mat-vec (matrix-free) operator" (Algorithm 1). This operator is used for preconditioning the conjugate gradient algorithm as given in equation (6). Only the pairs stored in the previous outer iteration(s) are used in the preconditioner application when a non-flexible conjugate gradient method is used. However, flexible version of the conjugate gradient method can also be used with the present technological advancement. The flexible version allows for a variable preconditioner within inner iterations 101. In this case, a slight modification in the application of the preconditioner is possible. Accordingly, the flexible version of the conjugate gradient method can use all pairs of $\{\gamma^l, H_i \gamma^l\}$ vectors (i.e., those from the previous nonlinear iteration $103_i$ and those generated during the current nonlinear iteration $103_{i+1}$). Further details of this flexible preconditioner approach are included in the Appendix.

The L-BFGS preconditioner requires a starting inverse Hessian, which is above approximated by scaled identity (5). The correct scaling can be crucial for the performance of the preconditioner. When Algorithm 1 is used as part of the present technological advancement to generate the preconditioner, the state-of-the-art preconditioner (5) constructed from the information at the outer iterations can be used as a starting inverse Hessian. Thus, the present technological advancement can combine information obtained from both the outer and inner iterations.

Provided that $H_i$ in (2) is positive definite for a Gauss-Newton system, it can be shown that the resultant algorithm produces a positive definite operator, and guarantees a decent direction and robust algorithm. If one uses a truncated Newton's method, additional care must be taken to preserve positive definiteness [2].

In step 209, in the second linear iterations $101_{i+1}$, the process continues to store the pairs of $\{\gamma^j, H_i\gamma^j\}$ vectors generated from the current iteration (i+1) during the solving of equation (6) using the conjugate gradient method.

In step 211, the model is updated in outer iteration $103_{i+1}$. The output of the inner iterations $101_{i+1}$ is $d_{i+1}$, which is used to update the model in the outer iteration $103_{i+1}$.

In step 213, it is determined whether convergence criteria or other predetermined stopping criteria has been reached for the updated physical property model. If not, the process returns to step 207 for another iteration. Iterations can continue until the convergence or stopping criteria is satisfied.

When the convergence or stopping criteria is satisfied, the process proceeds to step 215, in which a final physical property subsurface model is generated.

In step 217, the final physical property subsurface model can be used to manage hydrocarbon exploration. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

The preconditioner of the present technological advancement can be used along with alternative iterative methods. The above examples use the conjugate gradient method as the linear solver. The conjugate gradient method can be replaced with another iterative method, such as the generalized minimal residual method (GMRES). To be applicable to FWI, such alternative methods need to be iterative like the conjugate gradient method.

Construction of the preconditioner of the present technological advancement is not limited to Algorithm 1. Other alternative iterative methods such as limited memory SR1 can be used. The update vectors of Algorithm 1 are the change in the residual at each iteration and the change of the iteration of the linear solver.

Figure 3:
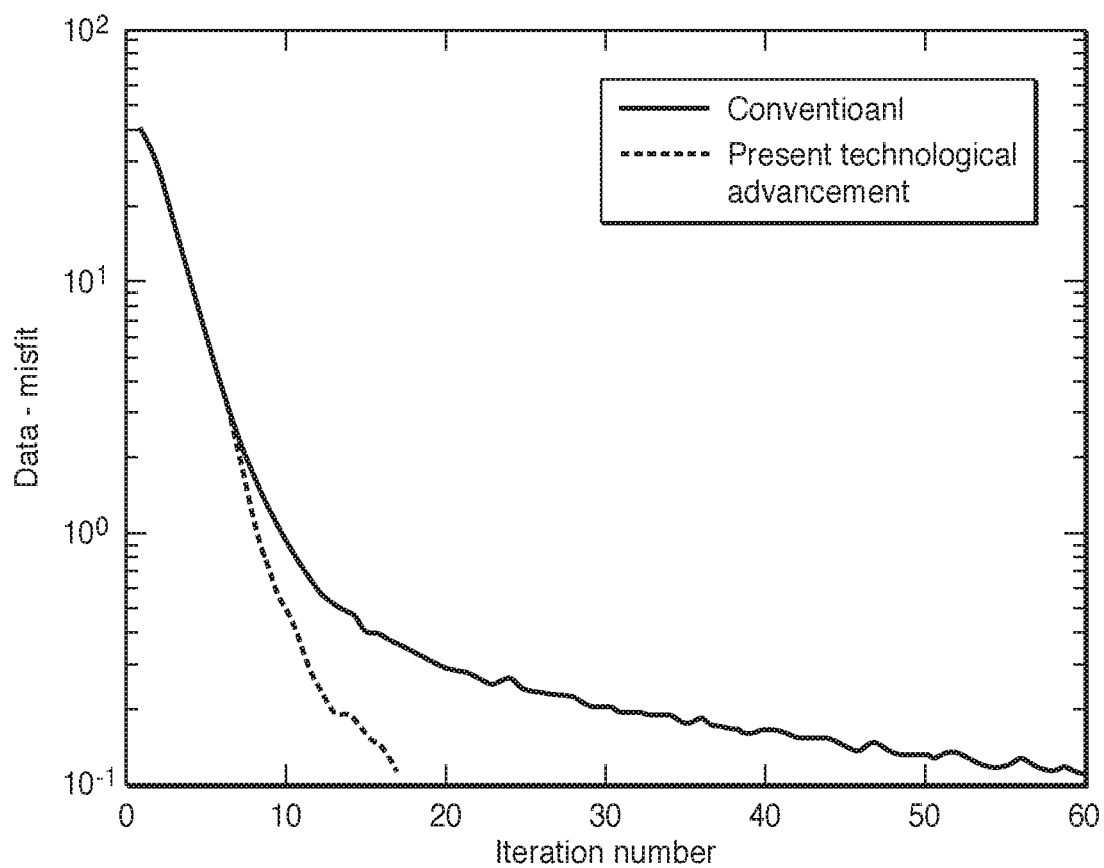
FIG. 3 describes an exemplary application of the present technological advancement.

FIG. 3 illustrates a comparison between the present technological advancement and conventional technology. The comparison is based on the data synthetically generated using a geologically appropriate model, and uses a state-of-the-art truncated-Gauss-Newton method as the baseline algorithm. FIG. 3 displays the convergence speed-up with the present technological advancement when it is used for a sequential-source [5] FWI problem constructing-the model.

In all practical applications, the present technological advancement must be used in conjunction with a computer, programmed in accordance with the disclosures herein. Preferably, in order to efficiently perform FWI, the computer is a high performance computer (HPC), known as to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following references are each incorporated by the reference in their entirety: [1] L. Metivier, R. Brossier, J. Virieux, and S. Operto, "Full Waveform Inversion and Truncated Newton Method", SIAM J. Sci. Comput., 35(2), B401-B437; [2] J. Nocedal and J. Wright, "Numerical Optimization", 2nd Edition, Springer; [3] V. Akcelik, G. Biros, O. Ghattas, J. Hill, D. Keyes, and B. van Bloemen Waanders, "Parallel algorithms for PDE constrained optimization, in Parallel Processing for Scientific Computing", SIAM, 2006; [4] J. L. Morales and J. Nocedal, "Automatic Preconditioning by Limited Memory Quasi-Newton Updating", SIAM J. Optim, 10(4), 1079-1096; [5] J. R. Krebs, J. E. Anderson, D. Hinkley, R. Neelamani, S. Lee, A. Baumstein and M. D. Lacasse, "Fast Full-wavefield Seismic Inversion Using Encoded Sources", Geophysics, 74; and [6] D. A. Knoll and D. E. Keyes, "Jacobian-free Newton-Krylov Methods: A Survey of Approaches and Applications", SIAM J. Sci. Comp. 24:183-200, 2002.

APPENDIX

The conjugate gradient method is an algorithm for finding the numerical solution of symmteric and positive-definite systems of linear equations. The conjugate gradient method is often implemented as an iterative algorithm, applicable to sparse systems that are too large to be handled by a direct implementation or other direct methods such as the Cholesky decomposition. Large sparse systems often arise when numerically solving partial differential equations or optimization problems. The conjugate gradient method can also be used to solve unconstrained optimization problems such as least squares minimization problem.

Description of the Method

Suppose solving the following system of linear equations $$Ax=b, \tag{A1}$$

for the vector x, where b is the known vector, and A is the known n-by-n matrix which is symmetric (i.e., $A^T=A$), positive definite ($x^T Ax > 0$ for all non-zero vectors x in $\mathbb{R}^n$), and real. The unique solution of this system is given by x*.

The Conjugate Gradient Method as a Direct Method

Two non-zero vectors u and v are conjugate with respect to A if $$u^T Av = 0. \tag{A2}$$

Since A is symmetric and positive definite, the left-hand side of equation (A2) defines an inner product $$\langle u, v \rangle_A := \langle Au, v \rangle = \langle u, A^T v \rangle = \langle u, Av \rangle = u^T Av, \tag{A3}$$

where $\langle , \rangle$ is the inner product operator of two vectors. The two vectors are conjugate if and only if they are orthogonal with respect to this inner product operator. Being conjugate is a symmetric relation: if u is conjugate to v, then v is conjugate to u.

Suppose that $$P = \{p_k : \forall i \neq k, k \in [1, n], \text{ and } \langle p_i, p_k \rangle_A = 0\} \tag{A4}$$

is a set of n mutually conjugate directions. Then P is a basis of $\mathbb{R}^n$, so the solution x, of Ax=b can be expanded within P space as $$x^* = \Sigma_{i=1}^n \alpha_i p_i, \tag{A5}$$

which leads to $$b = Ax_* = \Sigma_{i=1}^n \alpha_i A p_i, \tag{A6}$$

For any $p_k \in P$, $$p_k^T b = p_k^T Ax^* = \Sigma_{i=1}^n \alpha_i p_k^T A p_i = \alpha_k p_k^T A p_k, \tag{A7}$$

because $\forall i \neq k, p_i$ and $p_k$ are mutually conjugate.

$$\alpha_k = \frac{p_k^T b}{p_k^T A p_k} = \frac{\langle p_k, b \rangle}{\langle p_k, p_k \rangle_A}. \tag{A8}$$

This gives the following method for solving the equation Ax=b find a sequence of n conjugate directions, and then compute the coefficients $\alpha_k$.

The Conjugate Gradient Method as an Iterative Method

An iterative conjugate gradient method allows to approximately solve systems of linear equations where n is so large that the direct method is computationally intractable. Suppose an initial guess for x* by $x_0$ and assume without loss of generality that $x_0 = 0$. Starting with $x_0$, while searching for the solution, in each iteration a metric to determine if the current iterate is closer to x* (that is unknown). This metric comes from the fact that the solution x* is the unique minimizer of the following quadratic function $$f(x) = \frac{1}{2} x^T Ax - x^T b, x \in \mathbb{R}^n, \tag{A9}$$

and as this function $f$ becomes smaller, solution x gets closer to x*. The search (descent) direction for function $f$ in (A9) equals to the negative gradient b−Ax. Starting from a guessed solution $x_0$ ($x_0 = 0$ in case of no guessed solution) at the $k^{th}$ step, this descent direction is $$r_k = b - Ax_k \tag{A10}$$

The conjugation constraint described previously is an orthonormal-type constraint and hence the algorithm bears resemblance to Gram-Schmidt orthonormalization. This gives the following expression for conjugate of $r_k$ $$p_k = r_k - \sum_{i<k} \frac{p_i^T A r_k}{p_i^T A p_i} p_i \tag{A11}$$

Following this direction, the next optimal location is $$x_{k+1} = x_k + \alpha_k p_k \tag{A12}$$

where, $$\alpha_k = \frac{p_k^T b}{p_k^T A p_k} = \frac{p_k^T r_{k-1}}{p_k^T A p_k}, \tag{A13}$$

where the last equality holds because $p_k$ and $x_{k-1}$ are conjugate.

Conjugate Gradient Algorithm

The above algorithm gives the straightforward explanation of the conjugate gradient method. Seemingly, the algorithm as stated requires storage of all previous searching directions and residue vectors, as well as many matrix-vector multiplications, and thus can be computationally expensive. However, a closer analysis of the algorithm shows that $r_{k+1}$ is conjugate to $p_i$ for all i<k, and therefore only $r_k$, $p_k$, and $x_k$ are needed to construct $r_{k+1}$, $p_{k+1}$, and $x_{k+1}$. Furthermore, only one matrix-vector multiplication is needed in each iteration.

A modified algorithm is detailed below for solving Ax=b where A is a real, symmetric, positive-definite matrix, with an input vector $x_0$ (a guessed solution otherwise 0).

---
Algorithm A1: A conjugate gradient algorithm.
---

$r_0 = b - Ax_0$
$p_0 = r_0$
$k = 0$
REPEAT $$\alpha_k = \frac{r_k^T r_k}{p_k^T A p_k}$$

$x_{k+1} = x_k + \alpha_k p_k$
$r_{k+1} = r_k - \alpha_k A p_k$
IF $r_{k+1}$ is sufficiently small, EXIT REPEAT $$\beta_k = \frac{r_{k+1}^T r_{k+1}}{r_k^T r_k}$$

$p_{k+1} = r_{k+1} + \beta_k p_k$
$k = k + 1$
END REPEAT
RETURN $x_{k+1}$

---

Preconditioned Conjugate Gradient Method

Preconditioning speeds up convergence of the conjugate gradient method. A preconditioned conjugate gradient algorithm is given in Algorithm A2, which requires an application of preconditioner operator $B^{-1}$ on a given vector in addition to the steps in Algorithm A1.

---
Algorithm A2: A preconditioned conjugate gradient algorithm.
---

$r_0 = b - Ax_0$
$z_0 = B^{-1} r_0$
$p_0 = z_0$
$k = 0$

-continued

Algorithm A2: A preconditioned conjugate gradient algorithm.

REPEAT $$\alpha_k = \frac{r_k^T r_k}{p_k^T A p_k}$$

$x_{k+1} = x_k + \alpha_k p_k$
$r_{k+1} = r_k - \alpha_k A p_k$
IF $r_{k+1}$ is sufficiently small, EXIT REPEAT
$z_{k+1} = B^{-1} r_{k+1}$ $$\beta_k = \frac{r_{k+1} z_{k+1}^T}{r_k z_k^T}$$

$p_{k+1} = r_{k+1} + \beta_k p_k$
$k = k + 1$
END REPEAT
RETURN $x_{k+1}$

The preconditioner matrix B has to be symmetric positive-definite and fixed, i.e., cannot change from iteration to iteration. If any of these assumptions on the preconditioner is violated, the behavior of Algorithm A2 becomes unpredictable and its convergence can not be guaranteed.

Flexible Preconditioned Conjugate Gradient Method

For some numerically challenging applications, Algorithm A2 can be modified to accept variable preconditioners, changing between iterations, in order to improve the convergence performance of Algorithm A2. For instance, the Polak-Ribière formula $$\beta_k = \frac{z_{k+1}^T(r_{k+1} - r_k)}{z_k^T r_k}, \quad (A14)$$

instead of the Fletcher-Reeves formula used in Algorithm A2, $$\beta_k = \frac{z_{k+1}^T r_{k+1}}{z_k^T r_k}, \quad (A15)$$

may dramatically improve the convergence of the preconditioned conjugate-gradient method. This version of the preconditioned conjugate gradient method can be called flexible, as it allows for variable preconditioning. The implementation of the flexible version requires storing an extra vector. For a fixed preconditioner, $z_{k+1}^T t_k = 0$ both Polak-Ribière and Fletcher-Reeves formulas are equivalent. The mathematical explanation of the better convergence behavior of the method with the Polak-Ribière formula is that the method is locally optimal in this case, in particular, it does not converge slower than the locally optimal steepest descent method.

The invention claimed is:

1. A method, comprising:
   storing, in a computer memory, seismic data acquired from a seismic survey of a subsurface region;
   generating, with a computer, a final subsurface physical property model of the subsurface region by processing the seismic data with an iterative full wavefield inversion method, wherein the iterative full wavefield inversion method includes a non-linear outer iteration process comprising a plurality of outer iterations, each of which updates physical property values m of the physical property model and a nested linear inner iteration process, wherein:
   (1) each iteration i of the plurality of non-linear outer iterations includes a nested linear inner iteration process for determining a search direction $d_i$ to be used in updating the physical property values $m_i$ of said non-linear outer iteration; and
   (2) each of the second and subsequent outer iterations of the plurality of non-linear outer iterations further includes applying a preconditioner to the nested linear inner iteration process of such respective second and subsequent non-linear outer iteration, wherein the preconditioner at such non-linear outer iteration i+1 is generated based at least in part upon the nested linear inner iteration process of the immediately previous outer iteration i and wherein the preconditioner is generated using vectors $\{\gamma^j, H_i\gamma^j\}$ solved for in the nested inner iteration process, where $\gamma^j$ is the search direction for the linear system and where $H_i\gamma^j$ is the product of the vector $\gamma^j$ with a Hessian operator $H_i$; and
   creating, with a process, an image of the subsurface region from the final subsurface physical property model.

2. The method of claim 1, comprising using a Krylov-space method as a linear solver for the nested inner iteration processes.

3. The method of claim 1, comprising using a conjugate gradient method as a linear solver for the nested inner iteration processes.

4. The method of claim 2, wherein each preconditioner is generated based on the nested inner iteration process of the immediately previous outer iteration using a limited-memory Broyden-Fletcher-Goldfarb-Shanno (BFGS) method.

5. The method of claim 2, wherein each preconditioner is generated based on the nested inner iteration process of the immediately previous outer iteration using a quasi-Newton method.

6. The method of claim 1, wherein the preconditioner of each of the second and subsequent outer iterations is a variable preconditioner such that the preconditioner can change when solving a linear system, and the preconditioner is generated based on the nested iteration process of the then-current outer iteration in addition to the nested inner iteration process of the immediately previous outer iteration.

7. The method of claim 1, further comprising managing hydrocarbons based on the final subsurface physical property model of the subsurface region.

8. The method of claim 1, further comprising:
   using the final subsurface physical property model in interpreting a subsurface region for hydrocarbon exploration or production.

9. The method of claim 1, further comprising drilling for hydrocarbons at a location determined using the final subsurface physical property model of the subsurface region.

10. The method of claim 1, wherein a generalized minimal residual method is used as a linear solver for the nested inner iteration processes.

* * * * *